July 4, 1961
D. E. KITTRELL
2,991,127
TIPPING-BODY TAIL GATE LATCH
Filed Sept. 10, 1958
2 Sheets-Sheet 1
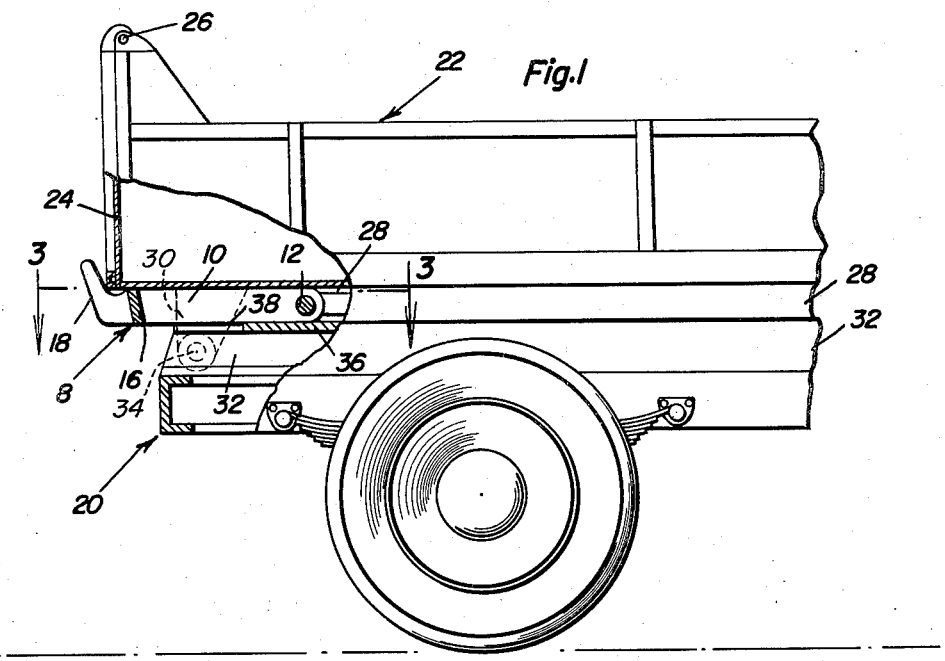
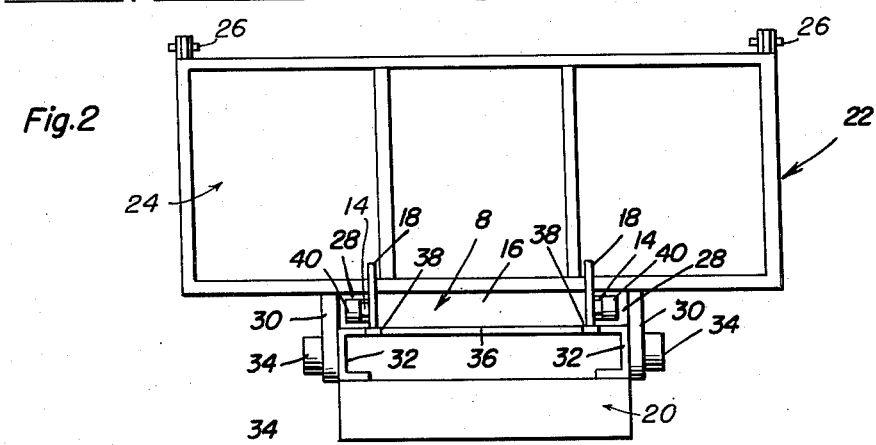
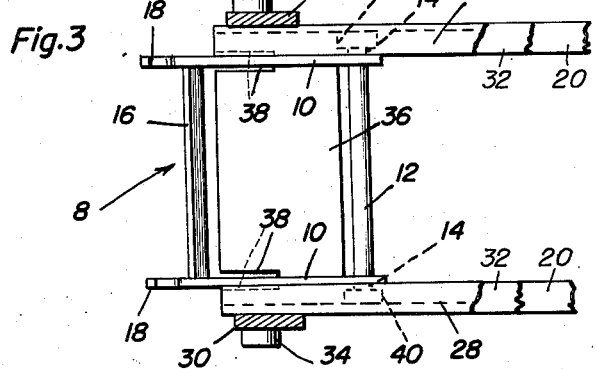
Doity E. Kittrell
INVENTOR.

July 4, 1961
D. E. KITTRELL
2,991,127
TIPPING-BODY TAIL GATE LATCH
Filed Sept. 10, 1958
2 Sheets-Sheet 2
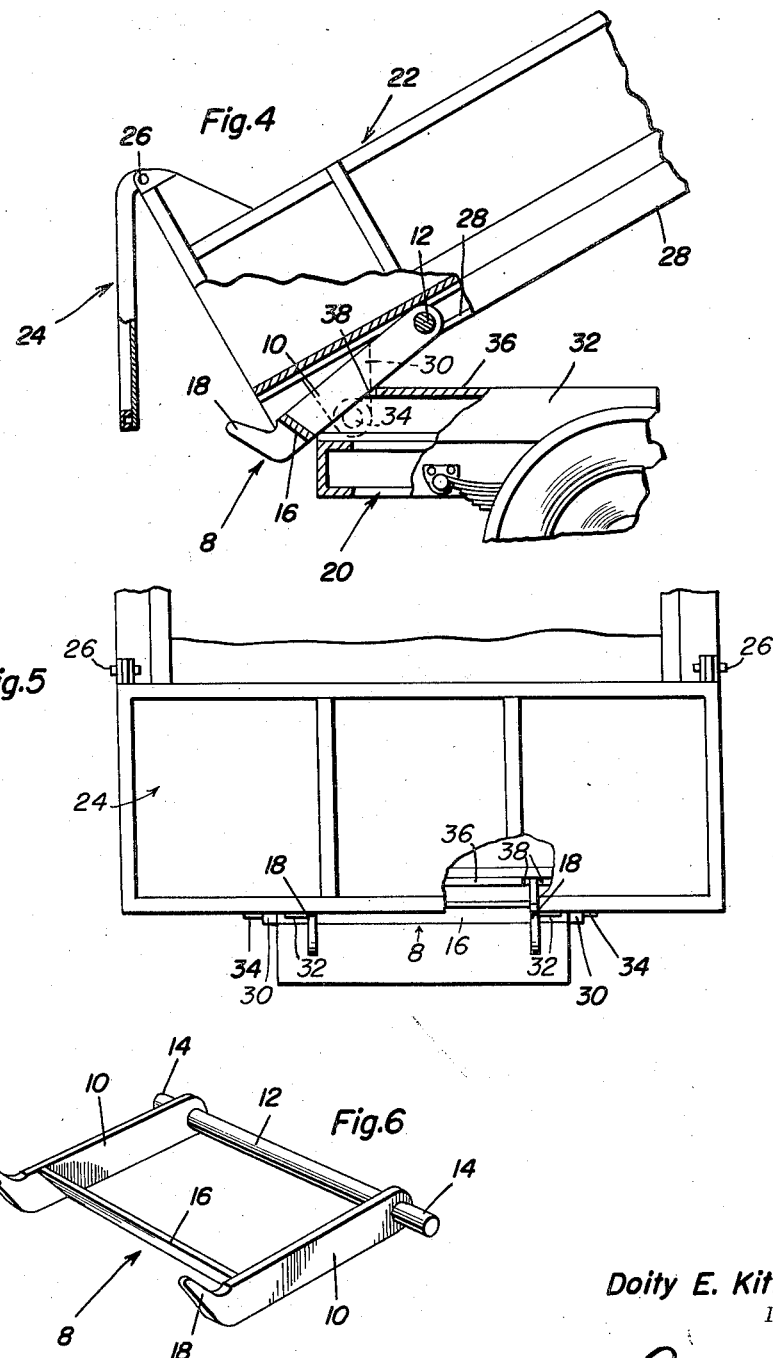
Doity E. Kittrell
INVENTOR.

United States Patent Office  2,991,127
Patented July 4, 1961

2,991,127
TIPPING-BODY TAIL GATE LATCH
Doity E. Kittrell, Rte. 7, Box 266, Spring Hill, Ala.
Filed Sept. 10, 1958, Ser. No. 760,125
2 Claims. (Cl. 298—23)

The present invention relates to certain new and useful improvements in a self-functioning latch for a tail gate such as is hinged on the rear discharge end of the tiltable body of a dump truck.

One object of the invention is to improve upon similarly constructed and performing automatic end gate latches and control means therefor and, having done so, to provide a construction which is feasible, practical, which is such that it will, no doubt, appeal to and be endorsed by manufacturers of dump truck bodies and will, and this is important, meet with approval of owners, users and drivers of trucks in the category stated.

Latch constructions and controls therefor which are usable on tail gates are of so many types, forms and styles that attempting to broadly categorize the same would not only be difficult but would perhaps be indefinite. As the art has been advanced, self-opening pivotally mounted end gates and tail gates have been adopted; built-in latches of one type or another have been evolved and produced. It follows that an object of the instant invention is to further contribute to this specific line of endeavor and to appropriate and use a pivotally mounted gravity lowered and opened latch which is capable of being installed for cooperation with the upper and lower channel frames of the frame construction of a more or less conventional dump body and frame structure and to do this without requiring noticeable or expensive alterations of the existing or stock parts.

Other objects, features and advantages will become more readily apparent from the following description and the accompanying drawings.

In the drawing, wherein like numerals are employed to designate like parts throughout the views:

FIG. 1 is a fragmentary rear end view of a dump truck with portions broken away and shown in section and illustrating the novel latch and how it is constructed and embodied for practical utility.

FIG. 2 is a rear end elevation of the structure seen in FIG. 1, observing the same in a direction from left to right.

FIG. 3 is a section on the horizontal line 3—3 of FIG. 1, with the chassis not detailed.

FIG. 4 is a view similar to FIG. 1 but showing the dump truck body tilted and the end gate open and the latch released.

FIG. 5 is an end elevation of the construction seen in FIG. 4.

FIG. 6 is a perspective view of the latch device by itself.

Taking up first the latch device and treating it as a ready-to-install structural entity or unit it will be seen that said device is unitarily denoted by the numeral 8 (FIG. 6). It comprises a pair of spaced parallel rigid arms 10 of duplicate construction. These arms are made from suitable bar stock and the right hand end portions thereof are connected with a shaft or axle 12 which spans the space between the arms and has terminal end portions 14 extending laterally beyond the adjacent exterior surface of the arms 10 and constitute attaching and operating journals. The median portions of the arms 10 are connected by an intervening oblique angled fixedly mounted brace or cross-piece 16. The end portions of the arms are reduced in width and are directed laterally and upwardly to provide a pair of hook-like retaining members or detents 18. These detents, considered in conjunction with the arms and other components, go to make up a simple and reliable latch device or, alternatively, a device embodying normally engaged easily trippable hook-like latches 18.

Taking up now the wheel supported chassis this is denoted generally by the numeral 20. The dump body, which may be said to be conventional in type, is denoted generally by the numeral 22 and embodies a flat load supporting and dumping bottom and upstanding front and side walls. The rear open end is normally closed by an end gate or tail gate 24 which is hingedly bracketed in place on the body as at 26. The tail gate thus constructed automatically responds and swings to an open position when the truck body is tilted from the horizontal carrying to the inclined dumping position seen in FIGS. 1 and 4 respectively. The frame structure mounting the dump body on the mobile wheel-supported chassis comprises an upper or second frame embodying spaced parallel channel irons 28 having a pair of oppositely disposed depending hinging lugs or brackets 30 (see FIG. 2) which are hinged to the channel irons 32 of the underlying or third frame by hinge pin or pivot connections 34. The third frame is supported on a first frame at arrow 20 which is also composed of parallel channel arms. It will be noticed that there is an abutment web or plate portion 36 which extends across the top portions of the channel irons 32 and the rear edge of this plate has clearance notches 38 provided properly therein. These notches are to accommodate the arms 10 of the latching device. The ends of the notches in the plate or web act as stops or supports for the latch frame as shown in FIGURE 4. As shown in FIGURE 4, the latch frame 10 rests on the forward edges of notches 38, and when the body 22 is lowered, the edges act as fulcrum points about which the frame is rotated clockwise for moving latches 18 upwardly toward gate 24. The arms parallel the open sides of the channel irons 28 and the projecting journals are mounted in bearing blocks 40 which are fitted and fixedly secured in any suitable manner in the respective channel portions of the upper channel irons 28. The hinge points are such that the latch frame or device 8 has a free gravity operable hinge action. Manifestly, the arms are so located that they operate in the clearance notches and so that the latches or detents 18 themselves are properly positioned to nose up around the lower edge portion of the swinging end gate or tail gate 24. It follows that when the dump body 22 is down the latch means functions in the way seen in FIG. 1. When the dump body opens up and assumes a tilted position the movement of the upper channel irons 28 away from the fixed channel irons 32 allows the action of gravity to permit the latch frame to come into play and drop of its own accord down to the releasing or unlatching position seen in FIG. 4 whereupon the lower edge portion of the gate 24 is freed and the gate swings open. The converse is true when the body is returned to its normal load transporting or horizontal position. That is to say, the latch device automatically collapse or folds to the gate latching position seen in FIGS. 1 and 2 in particular.

It will be evident from the description and drawings that the dump body is not in and of itself different from dump bodies commonly in use. However, it may be pointed out that it is the usual receptacle-type having a flat bottom and upstanding vertical front and side walls with the rear end open and provided with an ordinary tail gate. The tail gate swings in a vertical plane about the hinges which provide horizontal axes therefor and, as is evident, when the dump body is in horizontal load carrying position, the gate is closed. When the dump body is elevated to the tilted position shown in FIG. 1 the tail gate, when unlatched, swings automatically and rearwardly to the open position shown. It will be evident from the disclosure that the latch means 8 (FIG. 6) is maintained in an elevated latching position when it is positioned on an axis other than the axis between the dump body and chassis, this being accomplished by the web 36, which constitutes stop means, and which strikes the latch between the pivot axis 12 of the latch means and the hooks 18. Consequently, the latch 8 can only be lowered when the dump body is tilted or elevated. It follows therefore that the latch means 8 is positioned on the vehicle to function in response to the tilting of the dump body as is believed to be evident by comparing the illustration of the components seen in FIGS 1 and 4 respectively.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a dump body and chassis combination, an elongated horizontally disposed first frame provided with frame supporting and transporting wheels, a vertically liftable and lowerable load holding and transporting dump body normally assuming a horizontal load carrying position directly above and in alignment with said first frame, said dump body embodying a horizontal bottom marginally provided with cooperating upstanding front and side walls and having a rear end adapted for dumping a load when the bottom of the body is elevated to assume a rearwardly and downwardly sloping dumping position, a vertical end gate hingedly mounted on horizontal pivots carried by rear end portions of the side walls at the top of the dump body, said end gate normally assuming a vertical position closing the rear end of the dump body, an elongated horizontal second frame complemental to said first frame and affixed to the underside of the bottom of the dump body, said second frame embodying spaced parallel coplanar channel members, bearing blocks located in cooperating positions opposite each other and secured in the channel portions of said channel members, a horizontal third frame interposed between the first and second frames and affixed atop the first frame in alignment therewith and embodying spaced parallel coplanar channel members having rear end portions connected together by a web, said web being flat and flush with the top portions of the last mentioned channel members and having a rear edge located forwardly of said end gate and providing stop means, lugs secured to the channel members of the second frame rearwardly of said rear edge of said web and joined by horizontal pivots to the channel members of the first frame whereby to permit the dump body to be elevated from its horizontal position to its dumping position, and latch means for said end gate having a horizontal latching position between said web and the bottom of the dump body and having a forward end portion pivotally connected to said blocks, said latch means having integral latching hooks at the rear end thereof directed upwardly and releasably engaging the lower edge of said end gate to retain the latter in its closed position when the dump body is horizontal, said blocks and the cooperating pivot points of said latch means being located forwardly of fulcrum means for the lugs, said latch means resting atop and being maintained in said horizontal latching position by said web when the dump body is horizontal and the rear edge portions of the web constituting said fulcrum means for intermediate portions of said latch means whereby the latch means responding to gravity when the dump body is elevated may rock about said fulcrumming means to disengage said hooks from the end gate to permit opening of the same.

2. The device as defined in claim 1 wherein said latch means comprise a frame including a pair of spaced parallel coplanar bar-like arms, a rigid connecting member extending between and secured to forward end portions of said arms and projecting laterally outwardly beyond the same to provide a pair of journals, said journals being pivotally mounted in said blocks, and a rigid brace extending between and secured to rear end portions of said arms, said latching hooks being provided at the rear extremities of said arms.

References Cited in the file of this patent

UNITED STATES PATENTS

| 27,304 | Nevin | Feb. 28, 1860 |
| 459,512 | Merrill | Sept. 15, 1891 |
| 553,856 | Johnston et al. | Feb. 4, 1896 |
| 907,254 | Lied | Dec. 22, 1908 |
| 1,522,162 | Welton | Jan. 6, 1925 |
| 1,533,419 | Hug | Apr. 14, 1925 |
| 1,743,094 | Barrett | Jan. 14, 1930 |
| 1,983,051 | Smith | Dec. 4, 1934 |

FOREIGN PATENTS

| 475,456 | France | Feb. 27, 1915 |
| 623,454 | France | Mar. 21, 1927 |